United States Patent
Tennant (10) Patent No.: US 10,457,191 B1
(45) Date of Patent: Oct. 29, 2019

(54) TARP COVER SYSTEM WITH SUPPORT BOW CONFIGURATION FOR REDUCING STRESS ON TARP MATERIAL

(71) Applicant: SHUR-CO, LLC, Yankton, SD (US)

(72) Inventor: Terry James Tennant, Yankton, SD (US)

(73) Assignee: Shur-Co, LLC, Yankton, SD (US)

( * ) Notice: Subject to any disclaimer, the term of this patent is extended or adjusted under 35 U.S.C. 154(b) by 55 days.

(21) Appl. No.: 15/951,397

(22) Filed: Apr. 12, 2018

(51) Int. Cl.
| | | |
|---|---|---|
| B60P 7/04 | (2006.01) | |
| B60J 7/14 | (2006.01) | |
| B60J 11/02 | (2006.01) | |
| B60J 7/08 | (2006.01) | |
| B60J 7/06 | (2006.01) | |
| B60J 7/10 | (2006.01) | |
| E04H 15/64 | (2006.01) | |
| E04H 15/34 | (2006.01) | |

(52) U.S. Cl.
CPC ............... B60P 7/04 (2013.01); B60J 11/02 (2013.01); *B60J 7/068* (2013.01); *B60J 7/085* (2013.01); *B60J 7/102* (2013.01); *B60J 7/141* (2013.01); *E04H 15/34* (2013.01); *E04H 15/64* (2013.01)

(58) Field of Classification Search
CPC ... B60J 7/141; B60J 7/085; B60J 7/102; B60J 7/068; B60J 11/02; B60J 11/025; B60P 7/04; E04H 15/34; E04H 15/42; E04H 15/64
USPC ............ 296/100.11, 100.12, 100.14, 100.15, 296/100.18, 102, 104, 98
See application file for complete search history.

(56) References Cited

U.S. PATENT DOCUMENTS

| | | | | |
|---|---|---|---|---|
| 5,050,924 | A * | 9/1991 | Hansen ................ | B60P 7/0876 296/100.15 |
| 5,836,332 | A * | 11/1998 | Mick .................... | B62B 3/1436 135/124 |
| 6,513,856 | B1 * | 2/2003 | Swanson ................. | B60J 7/085 296/100.15 |
| 9,469,353 | B1 * | 10/2016 | McWilliams ........ | B62D 33/044 |
| 9,522,705 | B1 * | 12/2016 | McWilliams .......... | B62D 33/04 |
| 2013/0112232 | A1 * | 5/2013 | Clark ..................... | B60J 7/102 135/121 |
| 2013/0249236 | A1 * | 9/2013 | Smith ..................... | B60J 7/085 296/98 |
| 2013/0313855 | A1 * | 11/2013 | Schmeichel ............ | B60J 7/085 296/98 |
| 2014/0339850 | A1 * | 11/2014 | Grimes ................... | B60J 7/085 296/100.18 |

(Continued)

*Primary Examiner* — Gregory A Blankenship
(74) *Attorney, Agent, or Firm* — Jeffrey A. Proehl; Wood, Fuller, Shultz & Smith, PC (57) ABSTRACT

A system may include a container and a cover apparatus for selectively covering a top opening of the container. The cover apparatus may include a roll tube movably mounted on the container and extending between the container ends and parallel to the container sides, a cover tarp having at least a portion rolled about the roll tube, and at least one bow member configured to support the cover tarp over the top opening in a closed condition of the cover assembly. The bow member may be elongated and extend from one said side of the container to the other said side of the container across the top opening of the container. The bow members may be positioned in a substantially vertically-oriented bow plane, and the bow plane may be oriented at an oblique angle to a sidewall plane of the container.

11 Claims, 5 Drawing Sheets

(56) References Cited

U.S. PATENT DOCUMENTS

2019/0111770 A1* 4/2019 Hunter .................. B60P 7/04

* cited by examiner

TARP COVER SYSTEM WITH SUPPORT BOW CONFIGURATION FOR REDUCING STRESS ON TARP MATERIAL

BACKGROUND

Field

The present disclosure relates to covering systems for containers and more particularly pertains to a new tarp cover system with support bow configuration for reducing stress on tarp material.

SUMMARY

In one aspect, the present disclosure relates to a system which may comprise a container having a top opening, opposite sides and opposite ends. The container may have a pair of spaced side walls and a pair of spaced end walls extending between the side walls, with at least one of the side walls defining a sidewall plane. The system may also comprise a cover apparatus for selectively covering the top opening of a container, with the cover apparatus having a closed condition closing the top opening and an open condition permitting access to the top opening. The cover apparatus may include a roll tube movably mounted on the container and extending generally between the ends of the container and being oriented generally parallel to the side walls of the container. The cover apparatus may also include a cover tarp having at least a portion rolled about the roll tube. The cover tarp may be substantially completely unrolled from the roll tube and be extended across the top opening when the cover apparatus is in the closed condition, and may be substantially completely rolled about the roll tube and be retracted to one of the sides of the container when the cover apparatus is in the open condition. The cover apparatus may include at least one bow member configured to support the cover tarp in the closed condition of the cover assembly, with the bow member being elongated and extending from one said side of the container to the other said side of the container across the top opening of the container. The bow member may be positioned in a substantially vertically-oriented bow plane, and the bow plane may be oriented at an oblique angle to the sidewall plane of the container.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 6 thereof, a new tarp cover system with support bow configuration for reducing stress on tarp material embodying the principles and concepts of the disclosed subject matter will be described.

Figure 1:
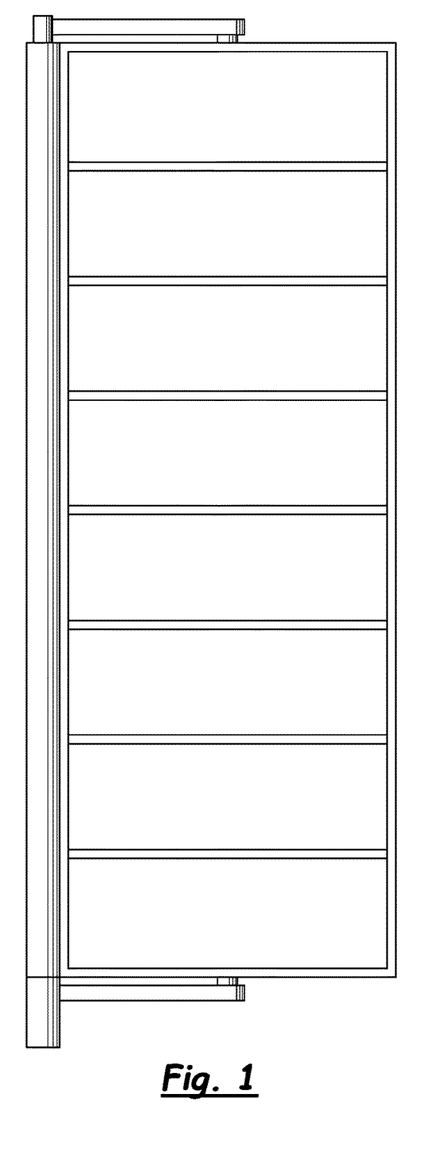
FIG. 1 is a schematic top view of a conventional tarp cover system in an open condition.
Figure 2:
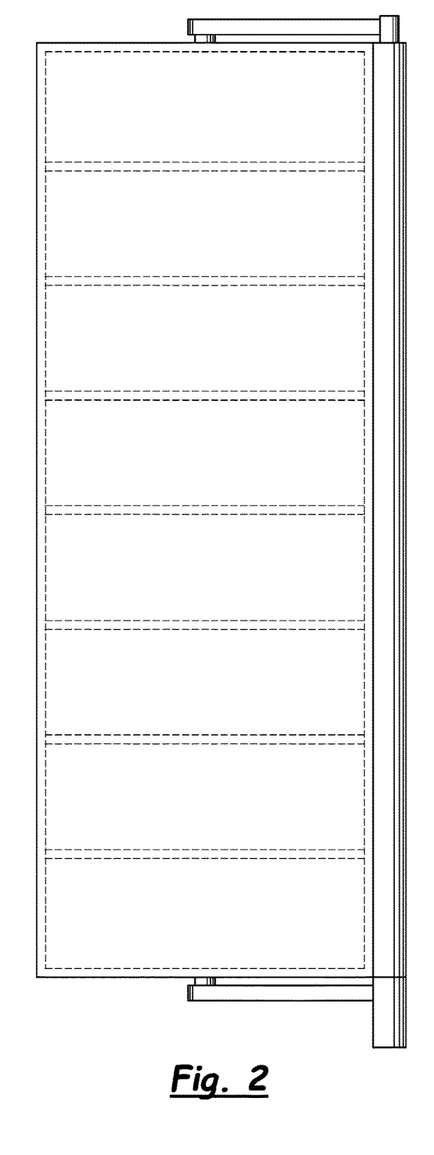
FIG. 2 is a schematic top view of a conventional tarp cover system in a closed condition.

Tarps have been used for covering the open tops of containers, and are often rolled to one side of the container to "open" or expose the open top of the container and unrolled over the open top to "close" or cover the open top (see, e.g., FIGS. 1 and 2). Typically the tarp is supported in the unrolled, closed condition by a series of support bows that extend from one side of the container to the opposite side of the container, and in many instances the bows have a slight upward "bow" or curvature that produces a slight peak in the closed tarp cover between the opposite sides. Usually the support bows are mounted on the long sides of the container and are generally uniformly spaced from and between the opposite ends of the container. The support bows extend between the container sides in a vertical plane that is perpendicular to the walls forming the sides of the container as well as the upper edges of those side walls.

The material of the tarp is wrapped or coiled about a strong roll tube which extends between the ends of the container and supports the portions of the tarp material located between the support bows as the roll tube rolls across the spaced bows and the tarp is unrolled from the tube (see e.g., FIG. 3) until the tarp assumes the closed condition of the cover (and also as the uncoiled tarp and roll tube roll across the spaced bows to re-coil the tarp onto the tube until the tarp assumes the open position of the cover).

Figure 3:
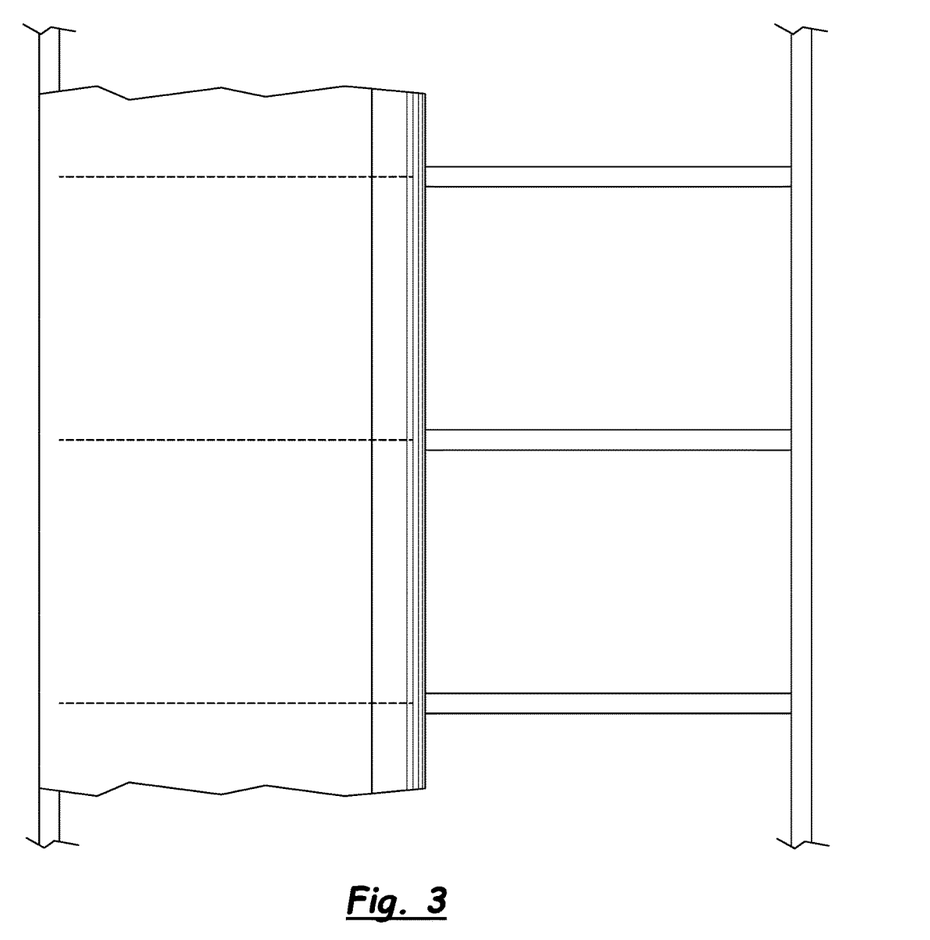
FIG. 3 is a schematic top view of a conventional tarp cover system in a partially closed condition.

The applicants have recognized that the conventional configuration of a tarp cover system tends to stress the tarp material along distinct lines that correspond to the locations of the support bows. More specifically, during times when the tarp material is being unrolled (or rolled up) across the support bows, areas of the material are being compressed or pinched between the roll tube from above and the support bow from below. This pinching action is concentrated on only the areas of the tarp material which are located above the support bows (when unrolled), and not the areas of the tarp located between the support bows (when unrolled), as these are the areas that end up between the roll tube and the support bows. The pinching stress thus generally occurs along lines on the tarp material located above the support bow. The broken lines in FIG. 3 illustrate the lines of contact between the tarp material and the support bows, and how the line of contact of the tarp portion which is coiled about the roll tube remains aligned with the support bow and thus continues to be pinched as rolling or unrolling of the tarp material continues. This repeated concentrated pinching of the tarp material tends to weaken the tarp material along the lines and shorten the life of the tarp in these areas as compared to other areas of the tarp.

Even more significantly, areas of the tarp located closer to the attachment of the tarp material to the roll tube (e.g., the innermost coils) are subjected to the pinching more often than areas of the tarp on the outermost coils. For example, if the roll tube rotates 20 times between the rolled and unrolled condition of the tarp material, the area of the tarp material located in one of the innermost coils will be pinched 20 times during each coil/uncoil cycle for the tarp between the open and closed conditions, while an area of the tarp material located on one of the outermost coils may only be pinched once or twice during each coil/uncoil cycle.

The problems caused by such pinching can be exacerbated by installations in which one or more support bows are higher or taller than adjacent support bows, due to, for example, manufacturing variations or simply variations in the manner in which the bows are installed. The higher bows tend to carry relatively more of the weight of the tarp material and roll tube than the relatively lower adjacent bows, and as a result the tarp material positioned above the higher support bow is subjected to even greater pinching forces.

The applicants have recognized that a primary contributor to the repeated pinching of the same areas of the tarp material on the line along the bow support is the perpendicular orientation of the support bow with respect to the side walls of the container. Since the support bows extend generally parallel to the direction of movement of the cover as the tarp material is rolled or unrolled, the same areas of the tarp material are subject to repeated pinching force.

The applicants also recognized that a highly effective approach for distributing the pinching force on the tarp material (so that a particular point on the tarp may only be subjected to the pinching effect once each time the tarp is either rolled or unrolled), is to position or orient the support bow generally along a line that is skewed with respect to the direction of movement of the rolling or unrolling of the tarp material, and generally not parallel to the direction of movement. The support bow may be positioned in a bow plane that is not oriented perpendicular (or substantially perpendicular) to the side of the container. Such an orientation of the support bow orients the line of the pitching pressure so that a particular point is only pinched once during a coil/uncoil cycle and not subject to repeated compressions between the roll tube and the support bow. Notably, the support bows do not need to be oriented parallel to each other to achieve this benefit, merely need to be oriented obliquely to the direction in which the tarp material unrolls from or rolls onto the roll tube.

Figure 4:
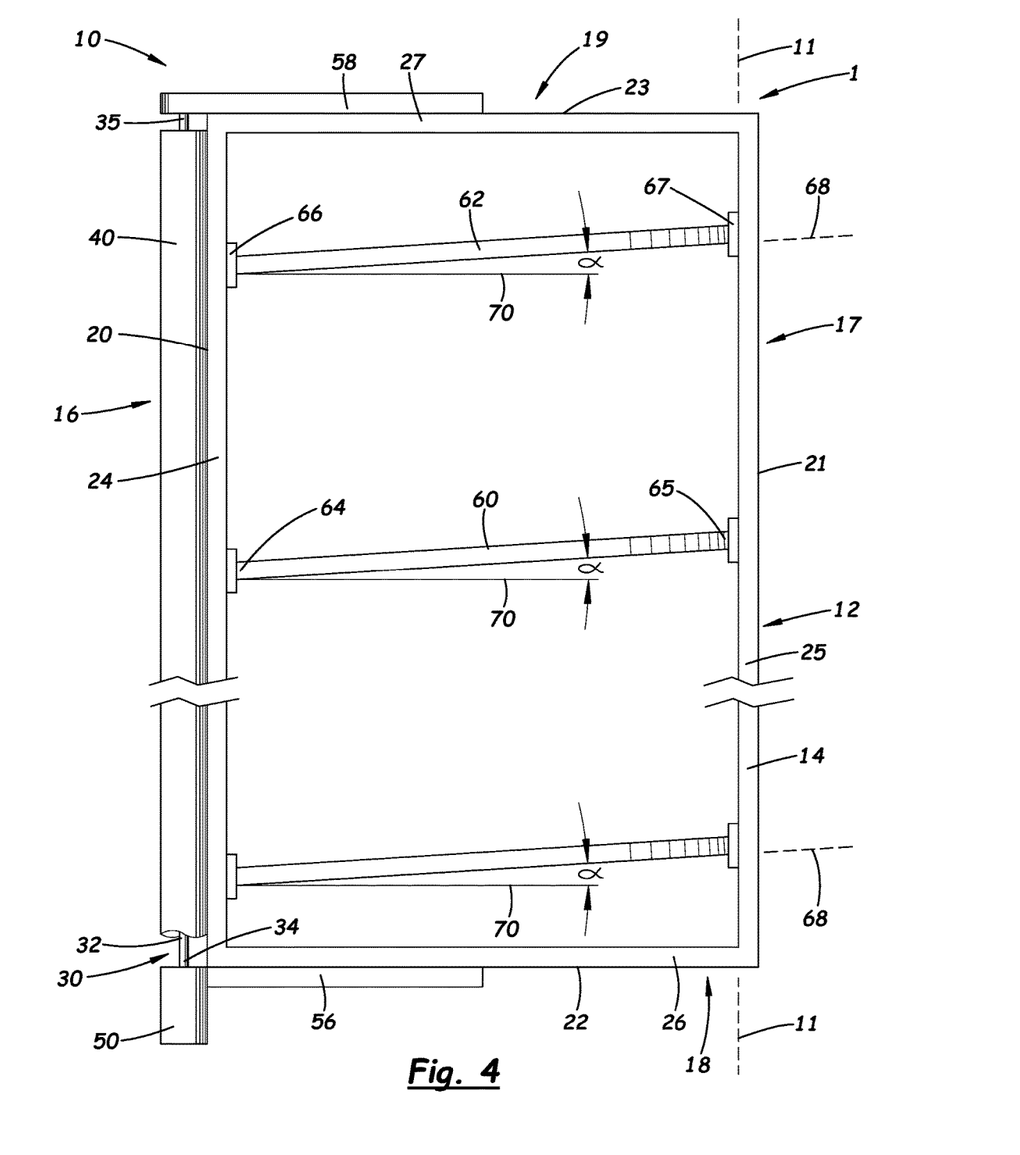
FIG. 4 is a schematic top view of a new tarp cover system in an open condition, according to an illustrative embodiment.

In one aspect of the disclosure, the system 1 includes a container 10 which has an open top and generally closed sides and bottom. The container 10 may comprise a hopper and may be mounted on a suitable vehicle, such as, for example, a truck, a trailer, or even a rail car chassis. The open top of the container 10 may form a top opening 12. The top opening 12 may lie in an opening plane 13 which may be generally horizontally oriented. The top opening 12 may be defined by an upper perimeter edge 14 of the container which may also lie in the opening plane. The container 10 may have opposite sides 16, 17 and opposite ends 18, 19. The container may comprise a pair of side walls 20, 21 positioned at the opposite sides 16, 17, and end walls 22, 23 which are positioned at the opposite ends 18, 19. At least one of the side walls 20, 21 may lie in a side wall plane 11 which is oriented substantially perpendicular to the opening plane 13, and the sidewall plane may also be oriented substantially vertical. Each of the side walls 20, 21 may form a side portion 24, 25 of the upper perimeter edge 14, and each of the end walls 20, 23 may form an end portion 26, 27 of the perimeter edge 14.

The system 1 may also include a cover apparatus 30 which is configured to selectively cover the top opening 12 of the container, and may be moved between a closed condition in which the apparatus 30 closes the top opening and an open condition which permits access to the interior of the container through the top opening. The cover apparatus 30 may include a roll tube 32 which extends generally between the opposite ends 18, 19 of the container, and may have a first end 34 which is positioned adjacent to the end 18 of the container, and a second end 35 which may be positioned adjacent to the end 19 of the container. The roll tube 32 may be oriented generally parallel to one or both of the side walls 20, 21 of the container and perpendicular to the container end walls 22, 23. The roll tube may be positioned at one of the sides 16 in the open condition and at the other side 17 in the closed condition.

The cover apparatus 30 may also include a cover tarp 40 which is positionable over the top opening 12 of the container 10, and may have at least a portion which is wrapped or coiled about the roll tube 32. The cover tarp 40 may have an inboard edge portion 42 which may be secured to the roll tube, and also an outboard edge portion 44 which may be secured to one of the sides or side walls of the container. When the cover apparatus 30 is in the closed condition, the cover tarp 40 may be substantially completely unrolled from the roll tube 32 and be extended across the top opening 12 of the container. When the cover apparatus 30 is in the open condition, the cover tarp 40 may be substantially completely wrapped or coiled about the roll tube 32 and may be retracted to one of the sides of the container. The cover tarp 40 may comprise a flexible sheet of material.

The cover apparatus 30 may also include a motor assembly 50 which is configured to rotate the roll tube 32 to spool and unspool, or wind and unwind, the cover tarp 40 on and off of the roll tube. The motor assembly may be positioned at one of the ends 34, 35 of the roll tube and thus may be located toward one of the ends 18, 19 of the container.

The cover apparatus 30 may also include at least one arm assembly 56 which is configured to support the roll tube 32 on the container. Typically, a pair of arm assemblies 56, 58 may be employed with one of the arm assemblies being located at each end of the roll tube. Each of the arm assemblies 56, 58 may be mounted on one of the opposite ends 18, 19 of the container. Each of the ends 34, 35 of the roll tube 32 may be rotatably mounted on a respective one of the arm assemblies 56, 58. Suitable arm assemblies are disclosed, for example, in U.S. Pat. No. 9,283,832, which is hereby incorporated herein by reference in its entirety. The motor assembly 50 may be mounted on one of the arm assemblies to rotate the roll tube with respect to the arm assembly.

The cover apparatus 30 may also include at least one bow member 60 which is configured to support the cover tarp 40 when the cover apparatus is in the closed condition, or moving from the open condition toward the closed condition. While one bow member may be utilized in a cover apparatus, in some embodiments a plurality of bow members 60, 62 may be employed to support the tarp 40, and the bow members may be substantially uniformly spaced between the end walls 22, 23 of the container. Each of the bow members may be positioned across the top opening 12 of the container to bridge between the opposite side walls 20, 21. Each bow member may be elongated and extend from one side wall the container to the other opposite side wall of the container. Each of the bow members 60, 62 may have opposite ends 64, 65 and may be arced or arched between the opposite ends in an upward direction out of the opening plane. The apparatus 30 may also include a bow mounting bracket 66 which is configured to mount one of the ends 64, 65 on the container. The bow mount bracket 66 may be mounted on one of the side walls 20, 21 of the container, and may be located toward the upper perimeter edge 14 of the container.

Each of the bow members may be positioned in a bow plane 68 which may be substantially vertically oriented, and thus substantially perpendicular to the opening plane of the container. A perpendicular reference plane 70 may be may also be substantially vertically oriented and may be oriented substantially perpendicular to the side wall plane 11.

Significantly, the bow plane 68 may be oriented in a non-perpendicular relationship with respect to the sidewall plane 11. The bow plane 68 may be oriented at an oblique angle with respect to the side wall plane, and may form an angle (α) with the perpendicular reference plane. The measure of the angle (α) between the bow plane 68 and the perpendicular reference plane 70 may have a range between approximately 1 degree and approximately 10 degrees. In some embodiments, the angle (α) may measure from approximately 3 degrees to approximately 7 degrees. In some further embodiments, the angle (α) may measure approximately 5 degrees.

Figure 5:
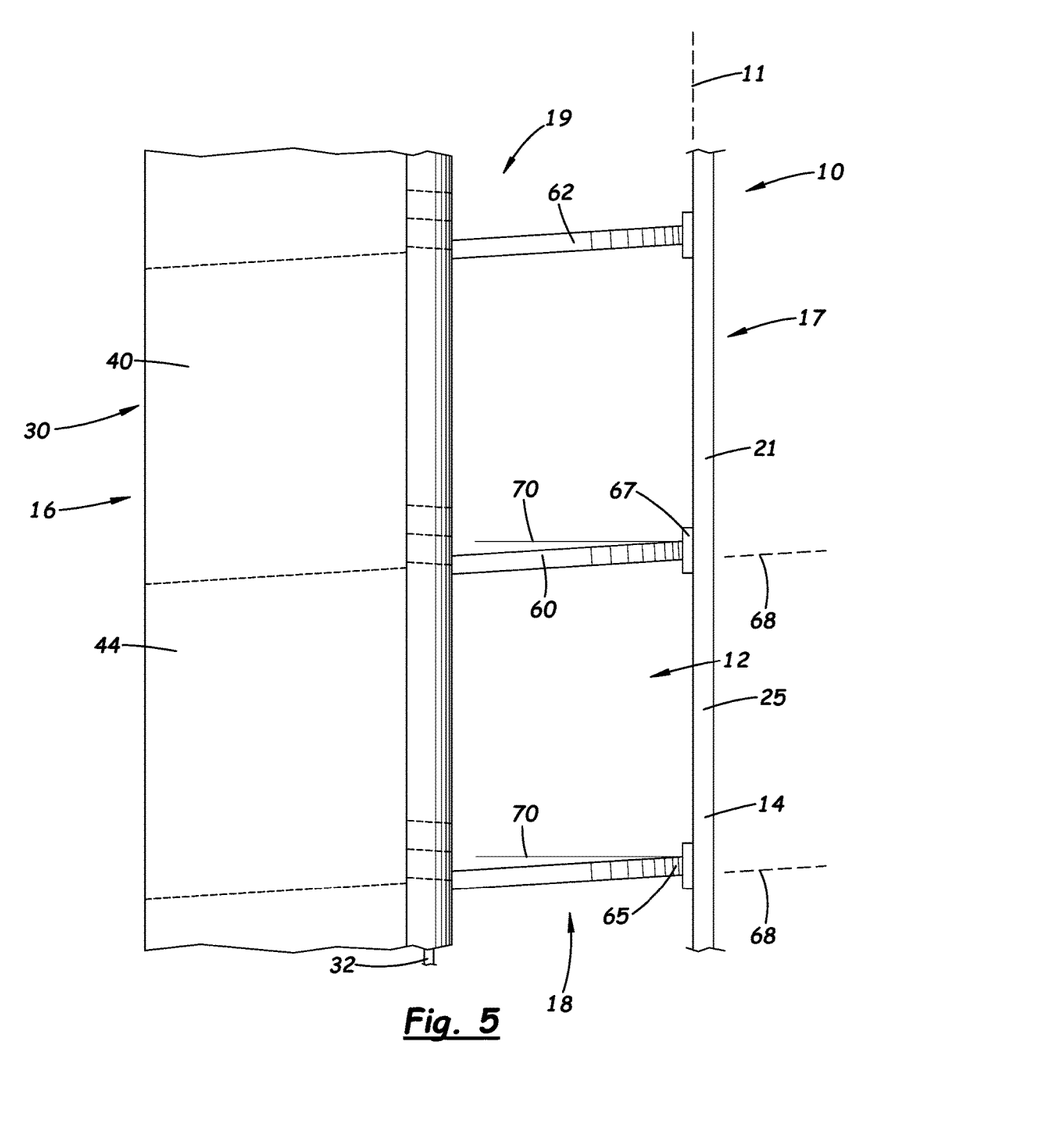
FIG. 5 is a schematic top view of the tarp cover system in a partially closed condition, according to an illustrative embodiment.
Figure 6:
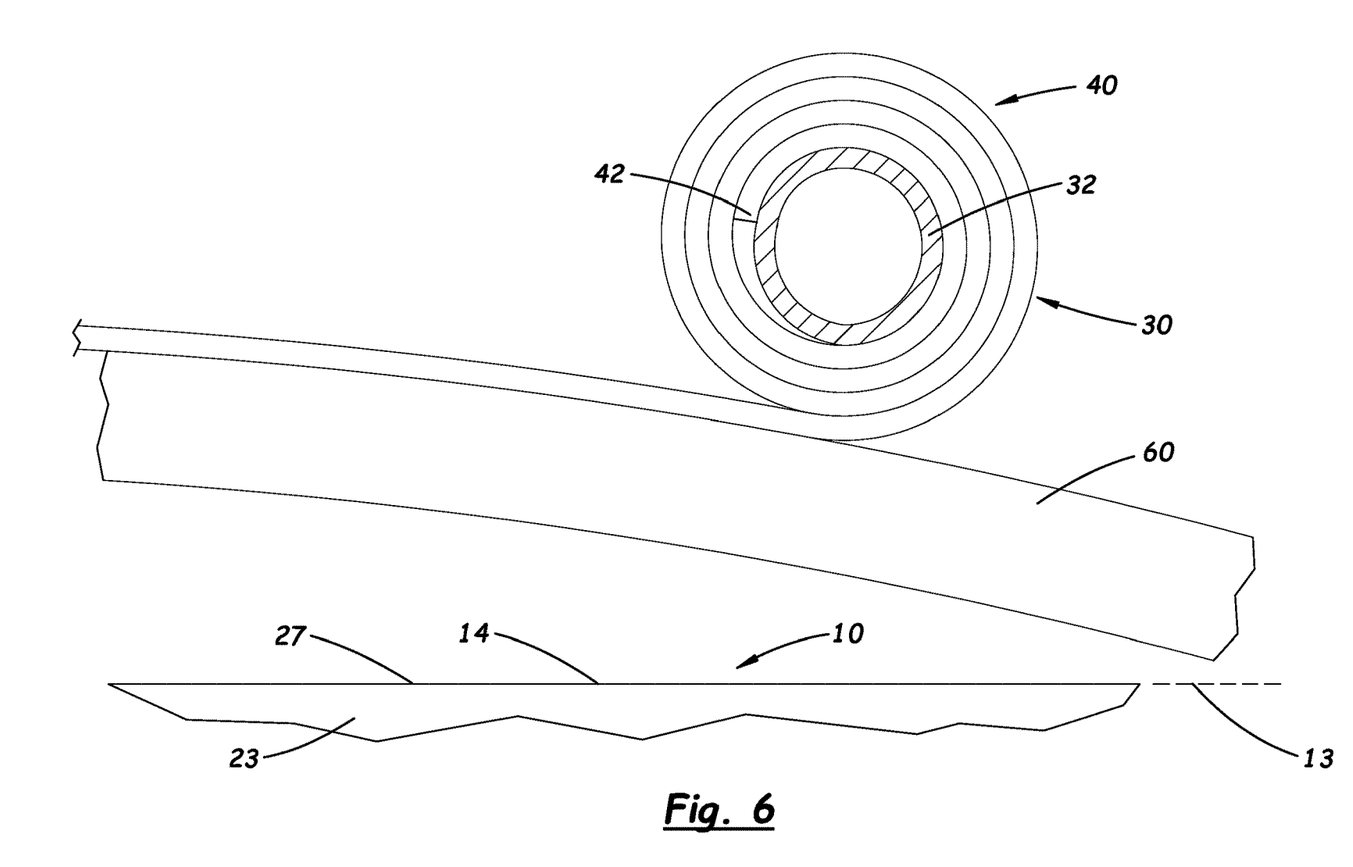
FIG. 6 is a schematic cross sectional view of a partially unrolled tarp of a conventional tarp cover system.

The broken lines in FIG. 5 illustrate the lines of contact between the tarp material of the cover tarp and the non-perpendicular oriented support bows. FIG. 5 also illustrates how the line of contact on the coiled portion of the cover tarp does not continue to align with the support bow as the tarp material is coiled or rolled onto the roll tube. As a result, the material at a point along the line of contact is not repeatedly compressed or pinched as illustrated in FIG. 3 showing a conventional design, but instead is only pinched a single time at each rolling or unrolling of the tarp material.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:
 a container having a top opening, opposite sides and opposite ends, the container having a pair of spaced side walls and a pair of spaced end walls extending between the side walls, at least one of the side walls defining a sidewall plane; and
 a cover apparatus for selectively covering the top opening of the container, the cover apparatus having a closed condition closing the top opening and an open condition permitting access to the top opening, the cover apparatus comprising:
  a roll tube movably mounted on the container and extending generally between the ends of the container and being oriented generally parallel to the side walls of the container;
  a cover tarp having at least a portion rolled about the roll tube, the cover tarp being substantially completely unrolled from the roll tube and being extended across the top opening when the cover apparatus is in the closed condition, the cover tarp being substantially completely rolled about the roll tube and being retracted to one of the sides of the container when the cover apparatus is in the open condition;
  at least one bow member configured to support the cover tarp in the closed condition of the cover assembly, the bow member being elongated and extending from one said side of the container to the other said side of the container across the top opening of the container; and
  the bow member being positioned in a substantially vertically-oriented bow plane, the bow plane being oriented at an oblique angle to the sidewall plane of the container.

2. The system of claim 1 wherein a substantially vertically-oriented perpendicular reference plane is oriented perpendicular to the sidewall plane, the bow plane being oriented at an oblique angle to the perpendicular reference plane.

3. The system of claim 2 wherein the oblique angle between the perpendicular reference plane and the bow plane measures approximately 1 degree to approximately 10 degrees.

4. The system of claim 2 wherein the oblique angle between the perpendicular reference plane and the bow plane measures approximately 3 degrees to approximately 7 degrees.

5. The system of claim 1 wherein each of the bow members has opposite ends and is arched between the ends.

6. The system of claim 1 additionally comprising a bow mounting bracket configured to mount an end of a said bow member on the container such that the bow member is oriented obliquely to the sidewall plane of the container.

7. The system of claim 1 additionally comprising an arm assembly mounting the roll tube on the container in a manner permitting movement of the roll tube with respect to the container.

8. The system of claim 7 additionally comprising a motor assembly configured to rotate the roll tube to spool and unspool the cover tarp.

9. The system of claim 8 wherein the motor assembly is mounted on the arm assembly.

10. The system of claim 1 wherein the cover tarp has an inboard edge portion secured to the roll tube and an outboard edge portion secured to one of the sides of the container.

11. The system of claim 1 wherein the cover tarp comprises a flexible sheet of material.

\* \* \* \* \*